A. SCOTTI.
WHEEL FOR TRACTORS.
APPLICATION FILED APR. 6, 1921.

1,420,870.

Patented June 27, 1922.

Inventor
Alfredo Scotti
by Graham and Harris
Attorneys

UNITED STATES PATENT OFFICE.

ALFREDO SCOTTI, OF WHITTIER, CALIFORNIA.

WHEEL FOR TRACTORS.

1,420,870. Specification of Letters Patent. Patented June 27, 1922.

Application filed April 6, 1921. Serial No. 458,896.

*To all whom it may concern:*

Be it known that I, ALFREDO SCOTTI, a citizen of the United States, residing at Whittier, in the county of Los Angeles and State of California, have invented a new and useful Wheel for Tractors, of which the following is a specification.

My invention relates to traction wheels, being more particularly a traction wheel such as is used on tractors for pulling farm implements and the like.

The principal object of my invention is to produce a traction wheel of simple form which is particularly adapted for use in light and sandy soils.

Other objects and advantages will appear hereinafter from the following description and drawings.

Referring to the drawings which are for illustrative purposes only,

Figure 1:
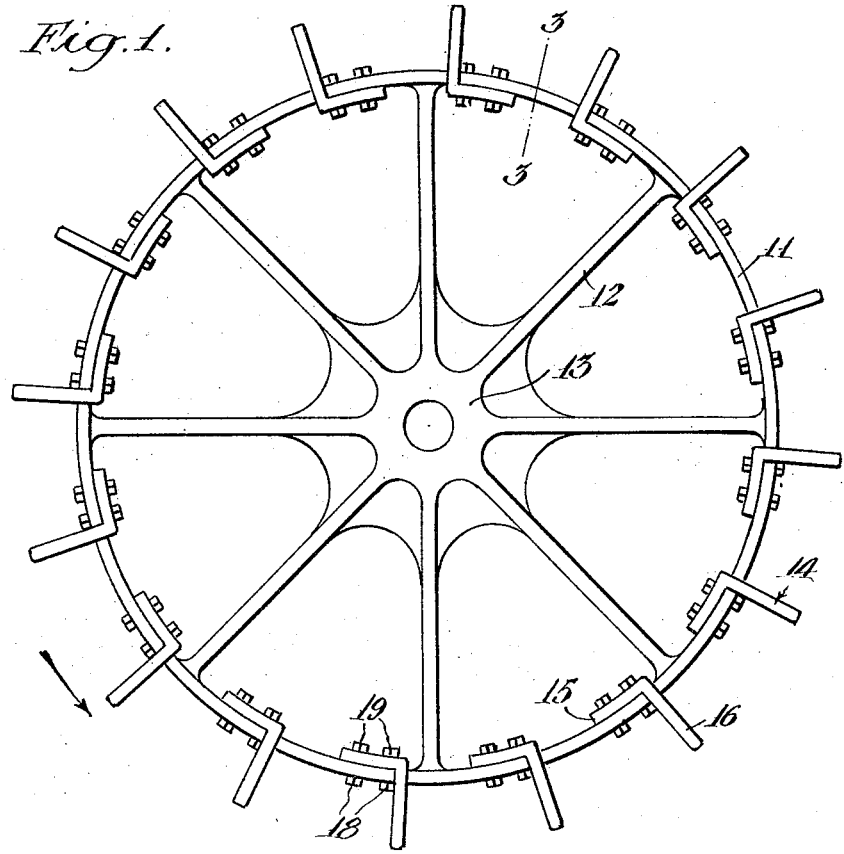
Fig. 1 is a side elevation of a traction wheel embodying a form of my invention.
Figure 2:
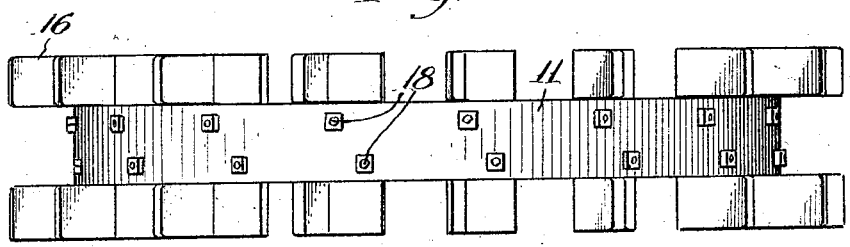
Fig. 2 is a face view of the wheel shown in Fig. 1.
Figure 4:
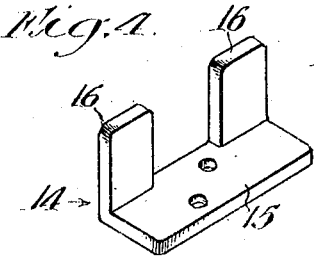
Fig. 4 is a perspective view of a flight member.
Figure 3:
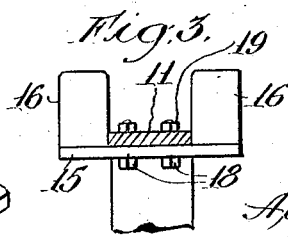
Fig. 3 is a sectional view on line 3—3, Fig. 1.

The wheel consists of a flat rim 11 which forms the tread of the wheel, such rim being connected by spokes 12 to the hub 13.

This wheel is provided with a plurality of flight members 14, each consisting of a plate 15 forming a tread portion and two outwardly extending arms or blades 16 forming flights.

These flight members 14 are attached to the rim 11 in the following manner:

The plate 15 is placed against the underside of the rim 11 with the flight members extending outwardly radially of the wheel at both sides of the rim, the plate 15 being secured to the inner side of the rim by means of suitable bolts indicated at 18, the nuts 19 on such bolts being upon the outside of the rim of the wheel, as shown.

By constructing a traction wheel in the manner above described, I have discovered that the wheel is particularly efficient in light soils and particularly so in soils of a sandy nature, the flights extending into the soil and giving necessary traction to the wheel and the ends of the plate 15 extending beyond each side of the rim 11 constitute additional tread surface for the wheel. The length of the flights beyond the rim or tread of the wheel when operating in ordinary light soil is such as to permit the rim of the wheel to ride lightly on the surface of the ground, but in sand and very light soil, the additional tread surface of the plates 15 support the wheel.

Wheels, designed as above described, are not subject to packing of the soil on the wheel as takes place on wheels provided with flights of the tread of the wheel, as the flights are arranged at the sides of the wheel tread.

I claim as my invention:

In combination with a traction wheel having a rim, a flight member for said wheel comprising an integral member consisting of a flat plate having a blade formed on each end thereof at the edge of said plate and extending outwardly therefrom at each side of the rim of the wheel, and means for securing said plate directly to the rim whereby said plate forms substantial lateral tread surfaces on both sides of the rim.

In testimony whereof, I have hereunto set my hand at Los Angeles, California, this 1st day of April, 1921.

ALFREDO SCOTTI.